United States Patent
Nam et al.

(10) Patent No.: US 6,967,703 B2
(45) Date of Patent: Nov. 22, 2005

(54) LIQUID CRYSTAL DISPLAY DEVICE AND METHOD THEREOF

(75) Inventors: Mi Sook Nam, Suwon-shi (KR); Heume Il Baek, Seoul (KR)

(73) Assignee: LG. Philips LCD Co., Ltd., Seoul (KR)

(*) Notice: Subject to any disclaimer, the term of this patent is extended or adjusted under 35 U.S.C. 154(b) by 58 days.

(21) Appl. No.: 10/603,761

(22) Filed: Jun. 26, 2003

(65) Prior Publication Data

US 2004/0027528 A1 Feb. 12, 2004

(30) Foreign Application Priority Data

Jul. 29, 2002 (KR) .................. 10-2002-0044692

(51) Int. Cl.[7] .......................................... G02F 1/1339
(52) U.S. Cl. .................. 349/153; 349/190; 349/156; 349/110
(58) Field of Search ................ 349/153, 156, 349/190, 110, 113

(56) References Cited

U.S. PATENT DOCUMENTS

| | | | |
|---|---|---|---|
| 4,775,225 A | * 10/1988 | Tsuboyama et al. | ........ 349/155 |
| 5,247,377 A | 9/1993 | Omeis et al. | |
| 5,511,591 A | 4/1996 | Abe | |
| 5,642,214 A | 6/1997 | Ishii et al. | |
| 5,742,370 A | 4/1998 | Kim et al. | |
| 6,011,609 A | 1/2000 | Kato et al. | |
| 6,016,178 A | 1/2000 | Kataoka et al. | |
| 6,055,035 A | 4/2000 | von Gutfeld et al. | |
| 6,163,357 A | 12/2000 | Nakamura | |
| 6,222,603 B1 | * 4/2001 | Sakai et al. | ................. 349/153 |
| 6,226,067 B1 | 5/2001 | Nishiguchi et al. | |
| 6,304,306 B1 | 10/2001 | Shiomi et al. | |
| 6,414,733 B1 | 7/2002 | Ishikawa et al. | |
| 6,445,437 B1 | * 9/2002 | Miyazaki et al. | ........... 349/156 |
| 6,570,639 B1 | * 5/2003 | Manabe et al. | ............. 349/190 |

* cited by examiner

Primary Examiner—Toan Ton
(74) Attorney, Agent, or Firm—McKenna Long & Aldridge LLP

(57) ABSTRACT

An LCD method of fabricating an LCD includes first and second substrates each comprising a dummy region and an active region, a main sealant pattern arranged between the first and second substrates and at a periphery of the active region of the first and second substrates, dummy sealant pattern arranged between the first and second substrates within the dummy region of the first and second substrates, a first column spacer between the first and second substrates and within the dummy regions of the first and second substrates, and a liquid crystal layer arranged between the first and second substrates within the active regions of the first and second substrates.

19 Claims, 8 Drawing Sheets

LIQUID CRYSTAL DISPLAY DEVICE AND METHOD THEREOF

This application claims the benefit of the Korean Patent Application No. P2002-44692 filed on Jul. 29, 2002, which is hereby incorporated by reference for all purposes as if fully set forth herein.

BACKGROUND OF THE INVENTION

1. Field of the Invention

The present invention generally relates to a liquid crystal display device and a method of fabricating the same. More particularly, the present invention relates to a liquid crystal display device and a method for fabricating the same wherein column spacers may be provided outside an active region for maintaining a cell gap and for improving a cell gap yield.

2. Background of the Related Art

Over time, demands on display technology have gradually increased and resulted in the development of a wide variety of flat display panels including liquid crystal displays (LCDs), plasma display panels (PDPs), electro luminescent displays (ELDs), vacuum fluorescent displays (VFDs), etc. Some of the aforementioned flat panel display panels are currently used as displays of various apparatuses. Owing to their excellent picture display quality (e.g., resolution and brightness), light weight, thin dimensions, large screen manufacturable screen size, and low power consumption, LCDs are used as televisions (TVs), replacing conventional cathode ray tubes (CRTs), and are widely used in portable displays such as monitors of notebook computers and the like.

LCDs generally include a liquid crystal display panel for displaying a picture and driving circuits for providing driving signals to the liquid crystal display panel. The liquid crystal display panel generally includes first and second glass substrates bonded to each other and spaced apart from each other by a gap. A layer of liquid crystal material is injected into the gap between the first and second glass substrates.

The first glass substrate (i.e., the TFT array substrate) generally supports a plurality of gate lines arranged at a fixed interval and extending along a first direction, a plurality of data lines arranged at a fixed interval and extending along a second direction, perpendicular to the first direction, a plurality of pixel regions arranged in a matrix pattern and defined at crossings of the plurality of gate and data lines, pixel electrodes provided in respective ones of the pixel regions, and a plurality switching elements such as thin film transistors (TFTs) that are capable of transmitting a signal from the data line to the pixel electrodes in response to receiving a signal from the plurality of gate lines.

The second glass substrate (i.e., the color filter substrate) generally supports a black matrix layer for shielding light from portions of the liquid crystal display panel outside the pixel regions, and a color filter array having a red, green, blue (RGB) color filter layer for selectively transmitting light having predetermined wavelengths, and a common electrode for implementing a picture.

The first and second substrates are uniformly spaced apart from each other by spacers and are bonded together using sealant. The distance between the first and second substrates is called the cell gap. The sealant includes a liquid crystal injection hole through which liquid crystal material is injected.

Liquid crystal material is injected into the liquid crystal display panel by evacuating the cell gap and immersing the liquid crystal injection hole into liquid crystal material. Liquid crystal material then flows into the cell gap via a capillary phenomenon. After the liquid crystal material has been injected, the liquid crystal injection hole is sealed with sealant material.

The aforementioned liquid crystal injection method thus requires that two substrates be bonded together before liquid crystal material is injected into the cell gap. Disadvantageously, the aforementioned liquid crystal injection method requires a prohibitive amount of time to ensure that cell gaps of large LCDs are completely filled with liquid crystal material. To alleviate the aforementioned problem, a method has been suggested wherein the layer of liquid crystal material is formed by dispensing liquid crystal material directly onto a substrate prior to bonding the first and second substrates together.

In fabricating LCDs via the aforementioned liquid crystal injection method, ball spacers must be evenly spread prior to bonding the substrates to ensure the cell gap between the two substrates is uniform. In fabricating LCDs via the aforementioned liquid crystal dispensing method, a patterned spacer or column spacer must be fixed to either the first or second substrate because ball spacers cannot effectively maintain a uniform cell gap when liquid crystal material is dispensed.

An LCD device and method for fabricating LCDs having column spacers will now be described in greater detail below. FIGS. 1A and 1B illustrate a layout of a related art LCD fabricated using column spacers. FIG. 1B illustrates a cross sectional view taken across a line I–I' of FIG. 1A.

Referring to FIG. 1A, LCDs fabricated via the liquid crystal dispensing method are generally not fabricated one at a time. Rather, LCDs having different dimensions may be fabricated simultaneously. Accordingly, a plurality of LCDs (i.e., unit panels) are simultaneously fabricated out of bonded base substrates by separating unit panels from within the bonded substrates via scribing and breaking processes.

FIG. 1A illustrates two base substrates bonded together and including a plurality of unit panels having active regions A/A. Main sealant patterns 10 are formed on either of the two base substrates at a periphery of each active region to bond the two base substrates together and prevent liquid crystal material from leaking outside active regions A/A. Dummy sealant patterns 20 are formed within the dummy region outside the active regions A/A and maintain the uniformity of the cell gap between the two bonded base substrates in dummy regions outside the active regions A/A. Liquid crystal is dispensed directly onto either of the two bonded substrates.

Referring now to FIGS. 1A and 1B, EPD (End Point Detection) holes 9a for measuring and controlling an extent of etching and the dummy sealant patterns 20 are formed in the dummy region. When a portion of the dummy sealant pattern 20 is formed in the EPD hole 9a, the dummy sealant pattern 20 induces the cell gap to become non-uniform. More specifically, cell gaps of reflective or semi-transparent LCDs are approximately 2.5 $\mu$m. The depth of the EPD hole 9a is dependent upon the type of protection film used wherein protection films are usually formed of organic insulating material and have a thickness of about 2 $\mu$m. Further, in forming the EPD hole 9a, the gate insulating film is typically removed. In view of the above, EPD hole 9a usually have a depth close to the thickness of the cell gap. Therefore, portions of the dummy sealant patterns 20 that are formed within the EPD hole 9a create a non-uniform cell gap. Further, the presence of the dummy sealant patterns 20 in structures such as EPD holes 9a create gap spots 30 in active regions close to the EPD hole 9a.

Related art solutions to the aforementioned problems of non-uniform cell gaps and gap spots generally include changing the positions. of structures such as EPD holes 9a and/or the dummy sealant patterns 20. These solutions, however, are difficult as they decrease the efficiency with which the surface area of the base substrates are used and they increase the difficulty of processing the unit panels once they are separated from the base substrates.

SUMMARY OF THE INVENTION

Accordingly, the present invention is directed to a liquid crystal display device and method of fabricating the same that substantially obviates one or more of the problems due to limitations and disadvantages of the related art.

An advantage of the present invention provides a liquid crystal display device and a method of fabricating the same, wherein column spacers may be formed within a dummy region to prevent a defective cell gap from being formed by a dummy sealant pattern located within an EPD hole.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device may, for example, include first and second substrates each comprising a dummy region and an active region, a main sealant pattern arranged between the first and second substrates and at a periphery of the active regions of the first and second substrates, a dummy sealant pattern arranged between the first and second substrates within the dummy regions of the first and second substrates, a first column spacer disposed between the first and second substrates and within the dummy regions of the first and second substrates, and a liquid crystal layer between the first and second substrates and within the active region.

In another aspect of the present invention, a method for fabricating a liquid crystal display device may, for example, include providing first and second substrates having a dummy and active regions, forming first and second column spacers in the dummy region and in the active region of one of the first and second substrates, forming a main sealant pattern at a periphery of the active region and forming a dummy sealant pattern in the dummy region of one of the first and second substrates, dispensing liquid crystal onto one of the first and second substrates within the active region, and bonding the first and second substrates together.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1A:
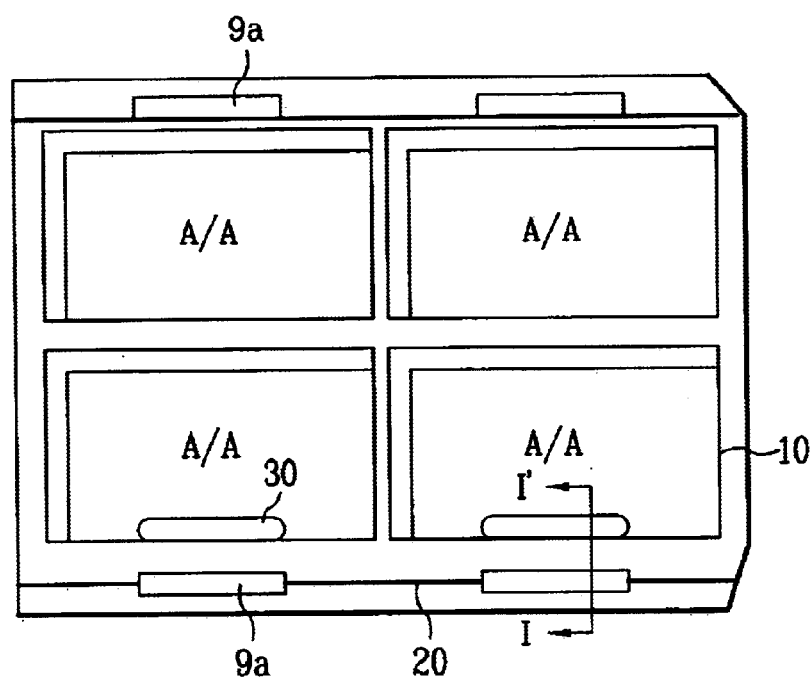
FIG. 1A illustrates a plan view of a related art LCD having a dummy sealant pattern inducing a defective cell gap.
Figure 1B:
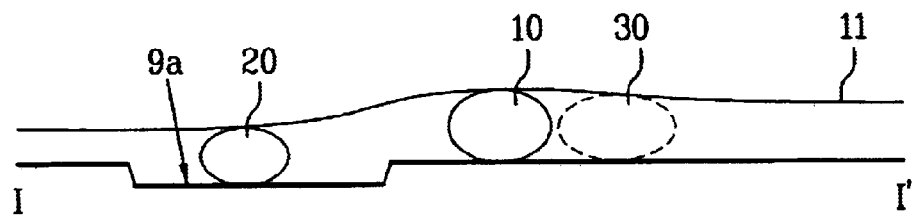
FIG. 1B illustrates a cross sectional view taken across line I-I' of FIG. 1A.
Figure 2:
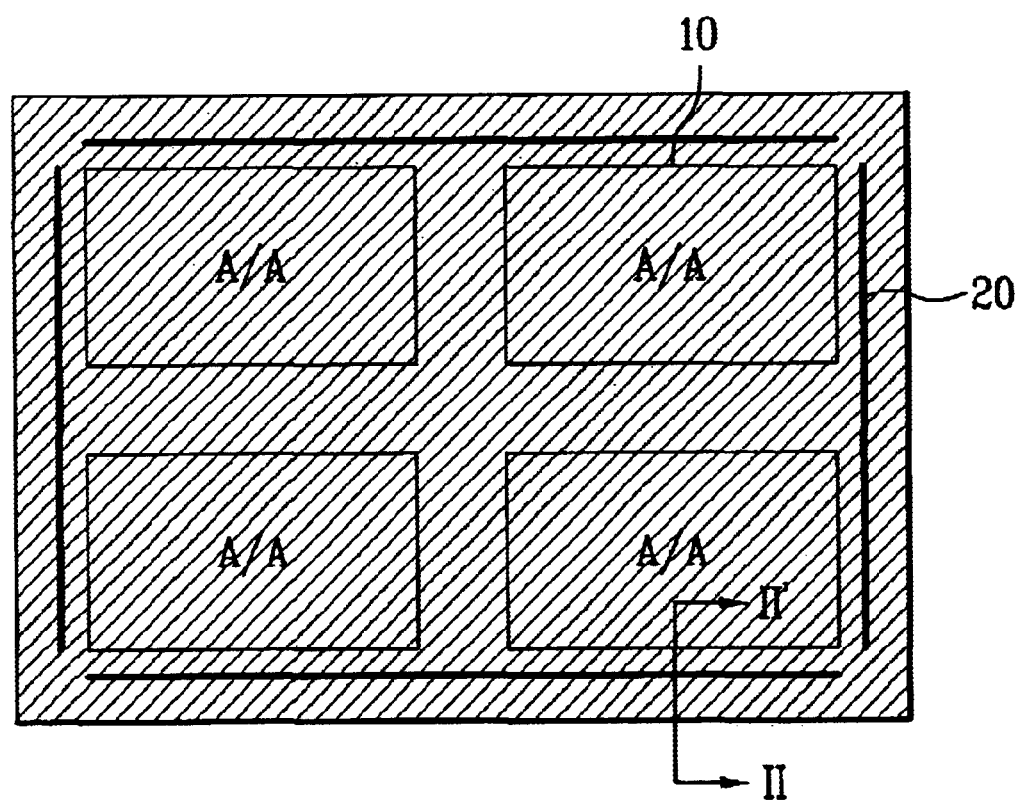
FIG. 2 illustrates a plan view of a sealant and spacer pattern in an LCD according to one aspect of the present invention.

FIG. 2 illustrates a plan view of a sealant and spacer pattern in an LCD according to one aspect of the present invention.

Referring to FIG. 2, a pair of opposing first and second substrates may be bonded together and may be provided with a plurality of unit panels having active regions A/A, main sealant patterns 10 may be provided for bonding the opposing first and second substrates together and for retaining liquid crystal material within the active regions, and dummy sealant patterns 20 may be provided within a dummy region surrounding portions of the main sealant patterns 10, for maintaining the cell gap between the opposing substrates, and for protecting the main sealant patterns 10. Column spacers (not shown) may be formed within the active regions and in the dummy region.

Figure 3A:
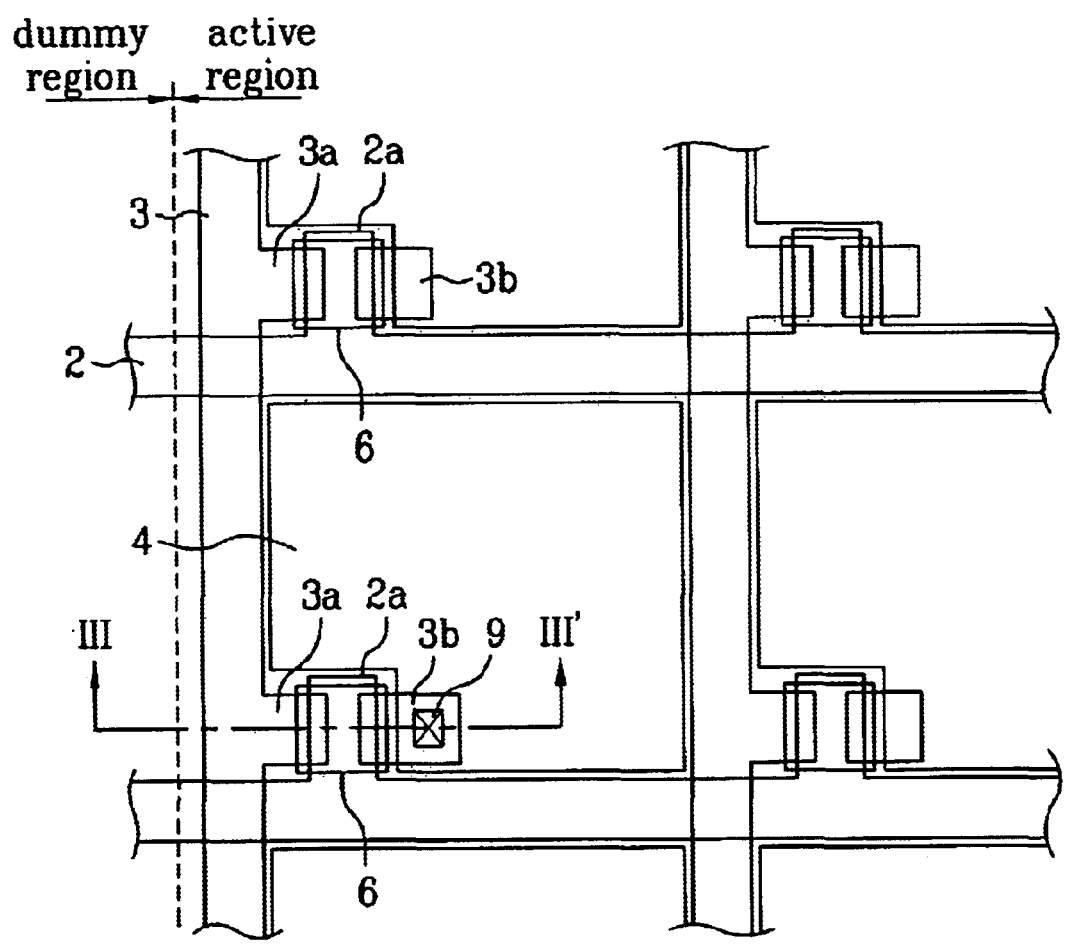
FIG. 3A illustrates a schematic view of a unit panel within the first substrate shown in FIG. 2 according to one aspect of the present invention.

As will be described in greater detail below, the first substrate may include TFT arrays formed within individual unit panels. FIG. 3A illustrates a schematic view of a unit panel within the first substrate shown in FIG. 2 according to one aspect of the present invention, FIG. 3B illustrates a cross sectional view of a transmissive LCD taken across line III–III' of FIG. 3A, and FIG. 3C illustrates a cross sectional view of a reflective LCD taken across line III–III' of FIG. 3A.

Referring to FIG. 3A, a TFT array may be formed on the first substrate 1. Accordingly, the first substrate may support a plurality of gate lines 2 arranged at a fixed interval and extending along a first direction, a plurality of data lines 3 arranged at a fixed interval and extending along a second direction, substantially perpendicular to the first direction, a plurality of pixel regions arranged in a matrix pattern and defined by crossings of the plurality of gate and date lines 2 and 3, pixel electrodes provided in respective ones of the pixel regions, and a plurality of switching elements such as thin film transistors (TFTs) capable of transmitting signals from the data lines 3 to the pixel electrodes 4 in response to receiving signals from the plurality of gate lines 2.

Figure 3B:
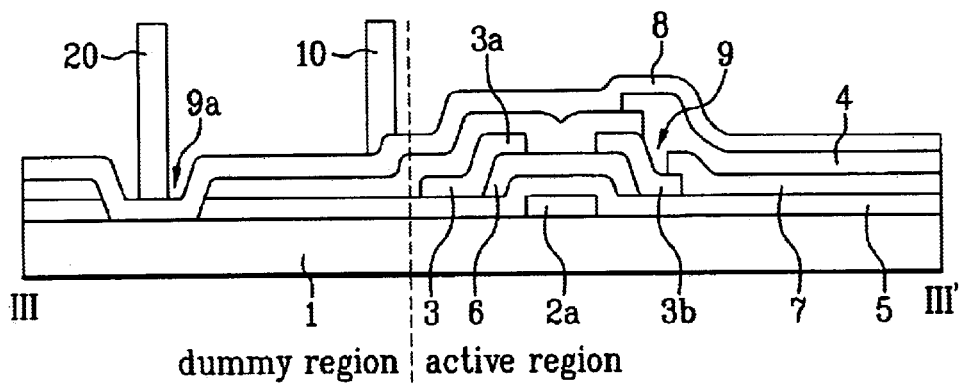
FIG. 3B illustrates a cross sectional view of a transmissive LCD taken across line III–III' of FIG. 3A.

Referring to FIGS. 3A and 3B, the thin film transistors (TFTs) and the pixel electrodes 4 in a transmissive LCD may, for example, be formed of a transparent metal such as an Indium Tin Oxide (ITO). Within the thin film transistor (TFT), a gate electrode 2a may be formed to project from the gate line 2 on the first substrate 1 and a gate insulating film 5 may be provided on the entire surface of the substrate including the gate electrode 2a. Over the gate electrode 2a, a semiconductor layer 6 may be formed on the gate insulating film 5. A source electrode 3a may be formed to project from the data line 3 at a first side of the semiconductor layer 6 and a drain electrode 3b may be formed on a second side of the semiconductor layer 6, opposite the first side. A protection film 7 may be formed over the entire surface of the first substrate, including the semiconductor layer 6 and source and drain electrodes 3a and 3b, respectively. A contact hole 9 may be provided within the protection film 7 such that the drain electrode 3b may electrically contact the pixel electrode 4 in a pixel region. An alignment film 8 for orienting subsequently provided liquid crystal material may be formed over the entire surface of the first substrate including the pixel electrode 4 and the protection film 7.

Figure 3C:
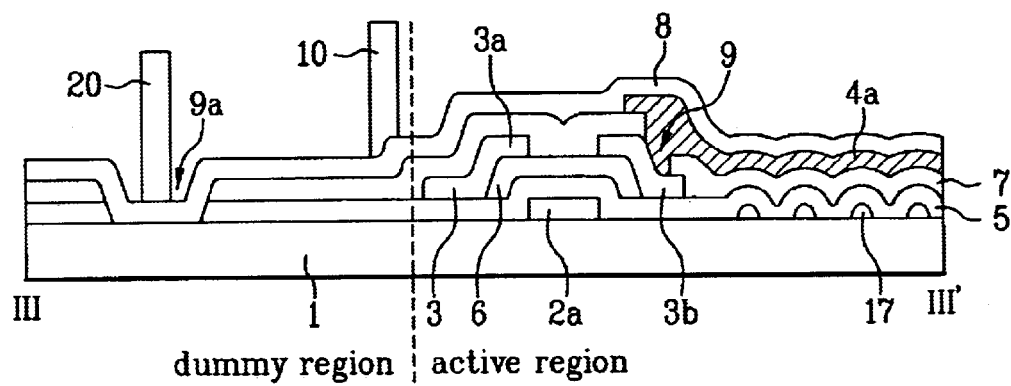
FIG. 3C illustrates a cross sectional view of a reflective LCD taken across line III–III' of FIG. 3A.

Referring to FIGS. 3A and 3C, the thin film transistors (TFTs) and the reflective electrodes 4 in a reflective LCD may, for example, be formed of a material such as Aluminum (Al). Within the thin film transistor (TFT), a gate electrode 2a may be formed to project from the gate line 2 on the first substrate 1, a plurality of bumps 17 may be formed within a pixel region on the first substrate 1, and a gate insulating film 5 may be provided over the entire surface of the substrate including the gate electrode 2a and bumps 17. In one aspect of the present invention, the gate insulating film 5 may be formed of at least one insulating material such as BCB (BenzoCycloButene), Acryl, $SiN_4$, $SiO_x$, etc. Over the gate electrode 2a, a semiconductor layer 6 having an active portion and an ohmic contact portion may be formed on the gate insulating film 5. A source electrode 3a may be formed to project from the data line 3 at a first side of the semiconductor layer 6, and a drain electrode 3b may be formed on a second side of the semiconductor layer 6, opposite the first side. A protection film 7 may be formed over the entire surface of the first substrate including the semiconductor layer 6, and the source and drain electrodes 3a and 3b, respectively. A contact hole 9 may be provided within the protection film 7 such that the drain electrode 3b may electrically contact a reflective electrode 4a provided in a pixel region. In one aspect of the present invention, the reflective electrode 4a may be formed out of a material having a high reflectivity such as Aluminum (Al). An alignment film 8 for orienting subsequently provided liquid crystal material may be formed over the entire surface of the first substrate including the reflective electrode 4a and the protection film 7. In one aspect of the present invention, bumps may be formed in the reflective electrode 4a, the protection film 7, and the gate insulating film 5 at positions corresponding to the bumps 17, thereby improving reflective characteristics of the reflective electrode 4a.

During fabrication of the aforementioned TFT transistor arrays in the active regions of their respective panel areas, the contact hole 9 is formed by selectively etching a portion of the protection film 7 arranged over the drain electrode 3b.

The contact hole 9 exposing the drain electrode 3b may be relatively narrow and deep and, therefore, the drain electrode 3b may be damaged if the protection film 7 is etched excessively. However, if the protection film 7 is not etched enough, the drain electrode 3b may not sufficiently contact the pixel electrode. Therefore, an EPD hole 9a may be formed in the dummy region by etching the gate insulating film 5 and the protection film 7 to measure and control the extent to which the protection film 7 is etched during the formation of the contact hole 9. In one aspect of the present invention, the protection film 7 may be formed of an organic insulating material to a thickness of about 2 µm and at least a portion of the gate insulating film 5 may be removed within the EPD hole 9a. In another aspect of the present invention, the EPD hole 9a may have a depth close to the width of the cell gap.

Figure 4A:
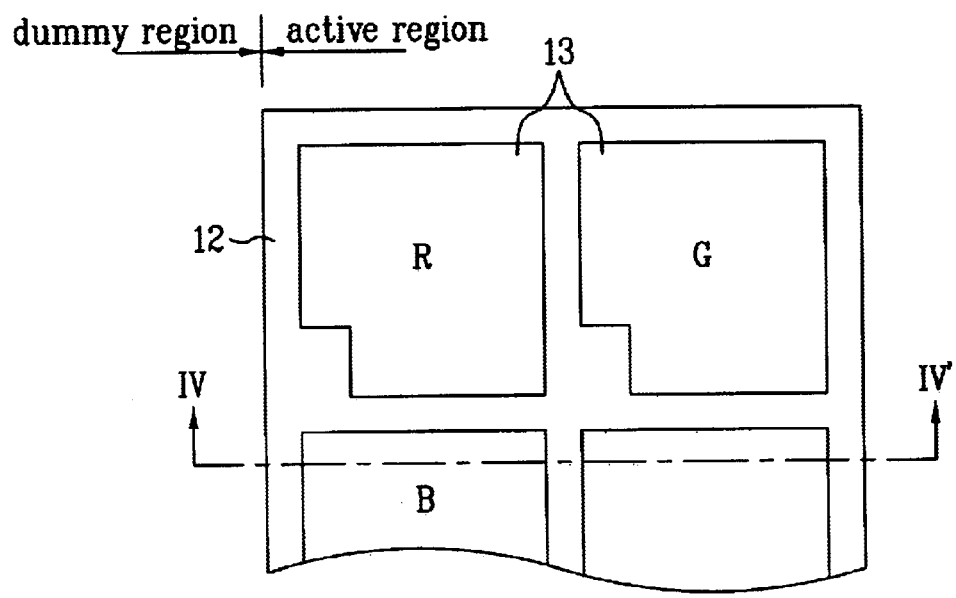
FIG. 4A illustrates a schematic view of a unit panel within the second substrate shown in FIG. 2.
Figure 4B:
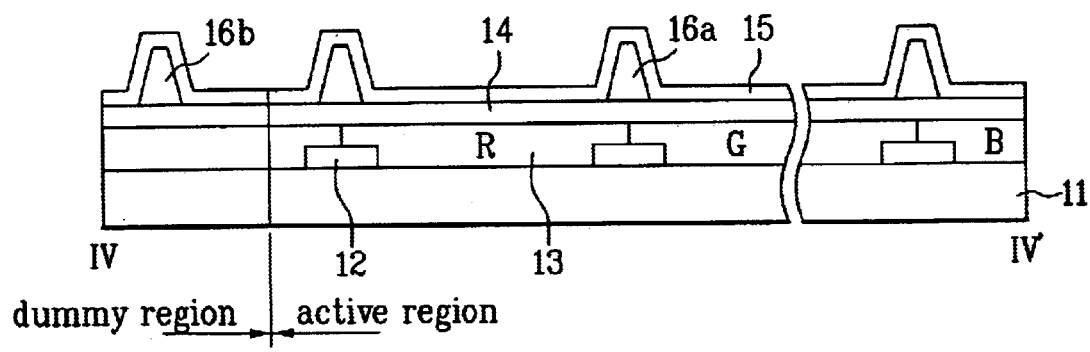
FIG. 4B illustrates a cross sectional view taken across line IV-IV' of FIG. 4A.

As will be described in greater detail below, the second substrate may include color filter arrays formed within individual unit panels. FIG. 4A illustrates a schematic view of a unit panel within the second substrate shown in FIG. 2, and FIG. 4B illustrates a cross sectional view taken across line IV–IV' of FIG. 4A.

Referring to FIG. 4A, a black matrix layer 12 may be provided for preventing the transmission of light through the second substrate 11 in areas outside the pixel regions defined by R, G and B color filter layers 13. The R, G, and B color filter layers 13 may be provided to selectively transmit predetermined wavelengths through the second substrate 11. A common electrode 14 may be provided over the entire surface of the second substrate 11, including the color filter layer 13, for implementing a picture. Column spacers 16a and 16b may be arranged on the common electrode 14 at fixed intervals, and an alignment film 15 may be formed over the entire surface of the second substrate 11, including the column spacers 16 and the common electrode 14, for orienting the liquid crystal. In one aspect of the present invention, column spacers 16a and 16b may be arranged in the active and dummy regions of the unit panels, respectively. Column spacer 16a, arranged in the active region, may maintain the uniformity of the cell gap between the first and second substrates while column spacer 16b, arranged in the dummy region, may prevent the cell gap from becoming non-uniform due to the presence of the dummy sealant pattern 20 within a structure such as the EPD hole 9a. Though not shown in the Figure, a portion of the black matrix layer 12 may be arranged proximate the column spacer 16a to substantially prevent any light leakage that may be generated as a result of any defective orientation induced in liquid crystal material by the alignment film 15 caused as a result of rubbing near the column spacer 16a.

Referring back to FIG. 2, the main sealant patterns 10 may be arranged at a periphery of individual active regions A/A, the dummy sealant patterns 20 may be arranged to surround the main sealant patterns 10, liquid crystal material may be dispensed on the first or second substrates, and the first and second substrates supporting the dispensed liquid crystal material and sealant patterns may be bonded together. In one aspect of the present invention, the main sealant and dummy sealant patterns may be formed on either of the first or second substrates.

Figure 5:
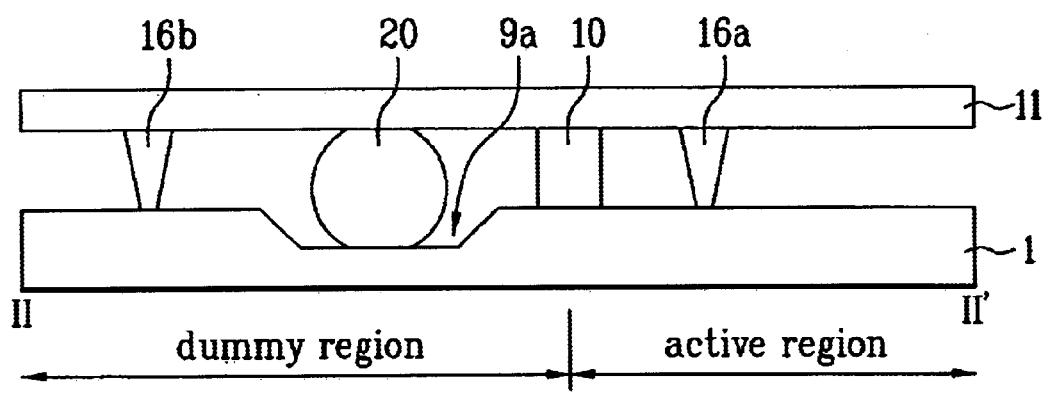
FIG. 5 illustrates a cross sectional view taken line II–II' shown FIG. 2.

FIG. 5 illustrates a cross sectional view taken line II–II' shown FIG. 2.

Referring to FIG. 5, the presence of the column spacer 16b in the dummy region substantially prevents the cell gap from becoming non-uniform and substantially prevents the formation of the gap spot in the active region proximate the EPD hole 9a, even if a portion of the dummy sealant pattern 20 is formed in the EPD hole 9a provided in the dummy region.

A method of fabricating the aforementioned LCD according to one aspect of the present invention will now be described in greater detail. FIGS. 6A–6D illustrate a method of fabricating a TFT array substrate according to one aspect of the present invention and FIGS. 7A–7C illustrate a method of fabricating a color filter array substrate according to one aspect of the present invention.

Figure 6A:
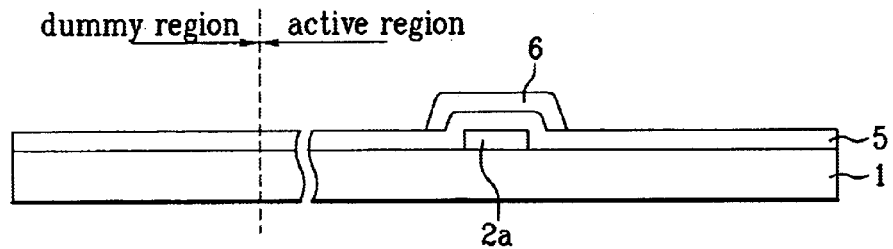
FIGS. 6A–6D illustrate a method of fabricating a TFT array substrate according to one aspect of the present invention.
Figure 7A:
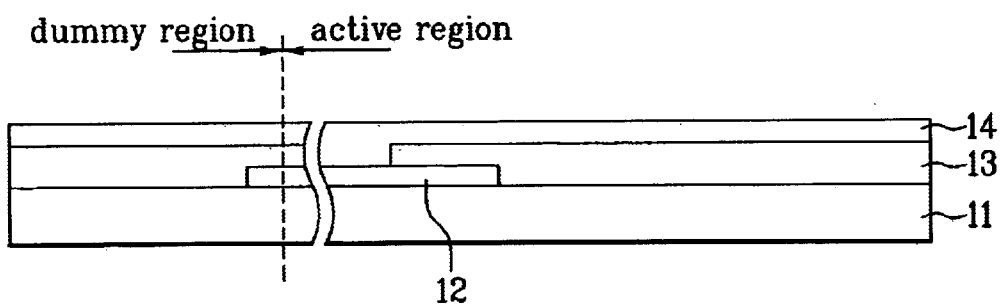
FIGS. 7A–7C illustrate a method of fabricating a color filter array substrate according to one aspect of the present invention.
Figure 7B:
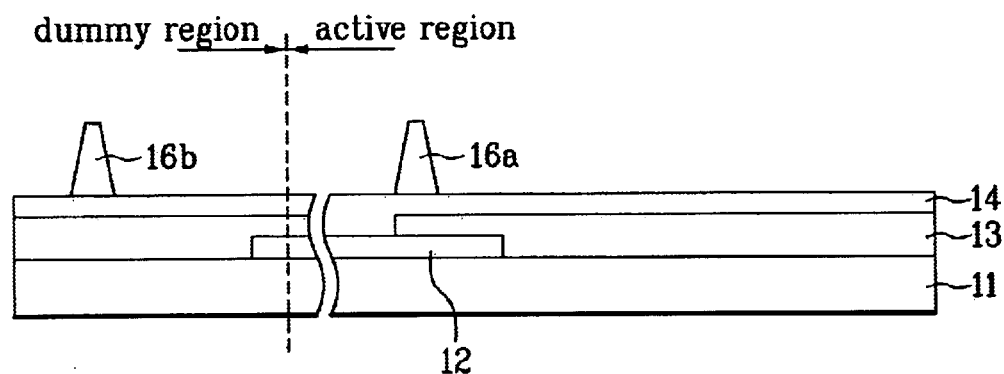
Figure 7C:
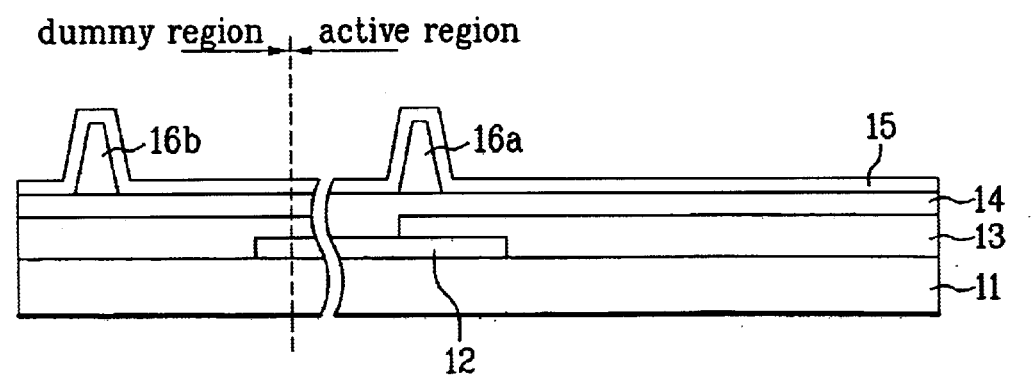

Referring to FIG. 6A, the first substrate 1 may be provided with a dummy region and an active region. A gate line (not shown) and a gate electrode 2a, projecting from the gate line, may be formed in the active region, a gate insulating film 5 may be formed over the entire surface of the active and dummy regions, and a semiconductor layer 6 may be formed on the gate insulating film 5 in a region corresponding to the gate electrode 2a.

Figure 6B:
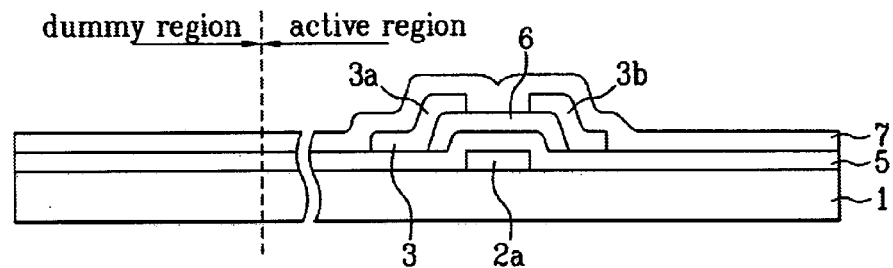

Referring to FIG. 6B, a data line (not shown) and a source electrode 3a, projecting from the data line, may be formed at a first side of the semiconductor layer 6 within the active region, a drain electrode 3b may be formed at a second side of the semiconductor layer 6, opposite the first side, and a protection film 7 may be formed over the entire surface of the active and dummy regions.

Figure 6C:
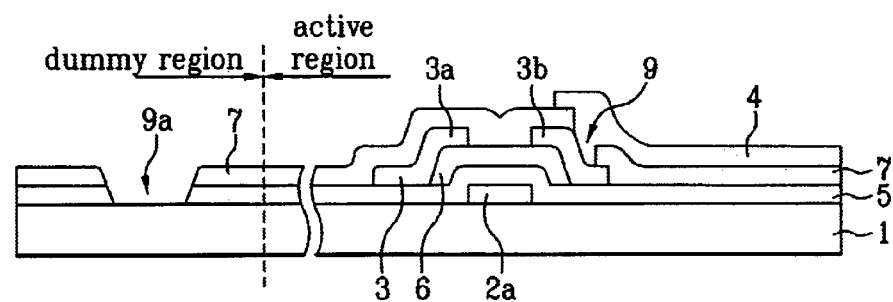

Referring to FIG. 6C, contact hole 9 may be formed within the protection film 7 in a region corresponding to the drain electrode 3b and an EPD hole 9a may be formed in the dummy region, respectively. The contact hole 9 may be used to electrically connect the drain electrode 3b with a subsequently formed pixel electrode and the EPD hole 9a may be provided for measuring and controlling the extent to which the contact hole 9 is formed by etching. In one aspect of the present invention, a pad contact hole may be formed in a pad region (not shown) by etching the gate insulating film 5 and the protection film 7. In another aspect of the present invention, the EPD hole 9a may be formed by etching the gate insulating film 5 and the protection film 7 in the dummy region.

After the contact hole 9 is formed, a pixel electrode 4 may be arranged in a pixel region of the active region and be electrically connected to the drain electrode 3b through the contact hole 9.

Figure 6D:
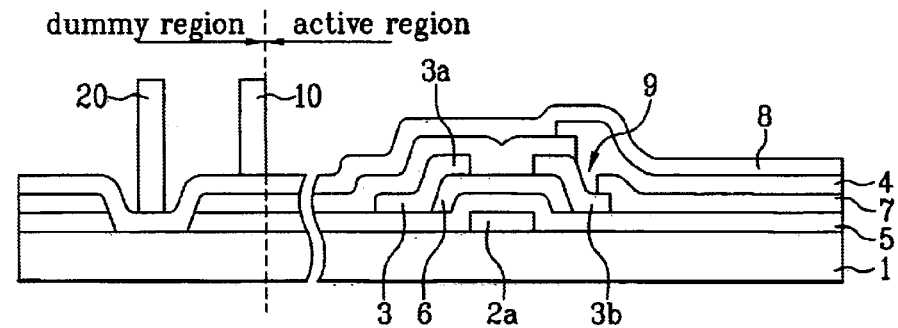

Referring to FIG. 6D, an alignment film 8 may be formed over the entire surface of the first substrate and subjected to a rubbing treatment for orienting subsequently provided liquid crystal material. Next, the main sealant pattern 10 and dummy sealant pattern 20 may be formed on the alignment film 8 at a periphery of the active region and within the dummy region, respectively.

Referring to FIG. 7A, the second substrate 11 may be provided with a dummy region and active region, substantially corresponding with the dummy and active regions of the first substrate 1. A black matrix layer 12 may be provided for preventing the transmission of light through the second substrate 11 in areas outside the pixel regions defined by the R, G, B color filter layers 13. In one aspect of the present invention, the black matrix layer 12 may be formed in a region corresponding to the location of a subsequently provided column spacer to substantially prevent any light leakage that may be generated as a result of any defective orientation in liquid crystal material induced by the alignment film 15 caused as a result of rubbing near the column spacer 16a. In another aspect of the present invention, the R, G, B color filter layer 13 may be provided to selectively transmit predetermined wavelengths through the second substrate 11. Next, a common electrode 14 may formed over the entire surface of the second substrate 11 including the color filter layer 13 for implementing a picture.

Referring to FIG. 7B, column spacers 16a and 16b may be formed on the common electrode 14 and spaced apart from each other by a predetermined distance. In one aspect of the present invention, the column spacer 16a is formed in the active region of the unit panel while the column spacer 16b is formed in the dummy region to prevent the cell gap from becoming non-uniform, even if a portion of the dummy sealant pattern 20 is formed in the EPD hole 9a provided in the dummy region.

Referring to FIG. 7C, the alignment film 15 may be formed over the entire surface of the substrate including the column spacers 16a and 16b and the common electrode 14. After being formed, the alignment film 15 is rubbed to selectively orient subsequently provided liquid crystal material.

While not shown, liquid crystal material may be dispensed onto either of the completely fabricated first or second substrates. After the liquid crystal material is dispensed, the first and second substrates may then be bonded together. In one aspect of the present invention, the main sealant patterns 10 and the dummy sealant patterns 20 may be formed on the second substrate while the column spacers 16a and 16b may be formed on the first substrate.

Though the principles of the present invention have been applied only to fabricating LCDs via liquid crystal material dispensing methods, it will be appreciated that the column spacers of the present invention may be formed in dummy regions during fabrication of LCDs using liquid crystal material injecting methods where ball spacers are typically employed.

In accordance with the principles of the present invention, use of the LCD device and of method in fabricating the same is advantageous because the formation of column spacers in dummy regions prevents cell gaps from becoming non-uniform, even if portion of dummy sealant patterns are formed structures such as EPD holes.

It will be apparent to those skilled in the art that various modifications and variation can be made in the present invention without departing from the spirit or scope of the invention. Thus, it is intended that the present invention cover the modifications and variation of this invention provided they come within the scope of the appended claims and their equivalents.

What is claimed is:

1. A liquid crystal display device comprising:
   first and second substrates each comprising an active region and a dummy region;
   a main sealant pattern arranged between the first and second substrates and at a periphery of the active regions of the first and second substrates;
   a dummy sealant pattern arranged between the first and second substrates and within the dummy regions of the first and second substrates;
   a first column spacer arranged between the first and second substrates and within the dummy regions of the first and second substrates; and
   a liquid crystal layer between the first and second substrates and within the active regions of the first and second substrates.

2. The device as claimed in claim 1, farther comprising a second column spacer arranged between the first and second substrates within the active region.

3. The device as claimed in claim 1, further comprising a recessed structure within the dummy region on the first substrate.

4. The device as claimed in claim 3, wherein at least a portion of the first column spacer is formed within the recessed structure.

5. A method for fabricating a liquid crystal display device, comprising:

provinding first and second substrates each comprising a dummy region and an active region;

forming first column spacers within the dummy regions of one of the first and second substrates;

forming a main sealant pattern at a periphery of the active region and forming a dummy sealant pattern within the dummy region of one of the first and second substrates;

dispensing liquid crystal material onto the active region of one of the first and second substrates; and bonding the first and second substrates.

6. The method as claimed in claim 5, further comprising forming second column spacers within active regions of one of the first and second substrates.

7. The method as claimed in claim 6, wherein the main sealant pattern and the dummy sealant pattern are formed on the first substrate and the second column spacers are formed on the second substrate.

8. The method as claimed in claim 5, wherein the main sealant pattern and the dummy sealant pattern are formed on the first substrate and the first column spacers are formed on the second substrate.

9. The method as claimed in claim 5, further comprising forming a recess within the dummy region of the first substrate.

10. The method as claimed in claim 9, further comprising forming at least a portion of the dummy sealant pattern within the recess.

11. A method for fabricating a liquid crystal display device, comprising:

providing first and second substrates having a dummy region and an active region;

forming a thin film transistor array within the active region on the first substrate, the thin film transistor array comprising a gate line, a data line, and source/drain electrodes;

forming a protection film on the first substrate;

forming a contact hole within the protection film to expose the drain electrode;

forming a pixel electrode in a pixel region so as to be connected to the drain electrode through the contact hole;

forming a color filter array in the active region of the second substrate;

forming a first column spacer in the dummy region of the second substrate;

forming a main sealant pattern at a periphery of the active region and forming a dummy sealant pattern within the dummy region of one of the first and second substrates;

dispensing liquid crystal onto one of the first and second substrates; and bonding the first and second substrates.

12. The method as claimed in claim 11, further comprising forming a second column spacer in the active region of the second substrate.

13. The method as claimed in claim 11, further comprising forming a recess in the dummy region of the first substrate.

14. The method as claimed in claim 13, further comprising forming at least a portion of the dummy sealant pattern within the recess.

15. The method as claimed in claim 11, wherein the recess is formed in the protection film.

16. The method as claimed in claim 11, wherein the pixel electrode is a transparent electrode.

17. The method as claimed in claim 11, wherein the pixel electrode is a reflective electrode.

18. The method as claimed in claim 11, further comprising forming a black matrix layer within the active region of the second substrate.

19. The method as claimed in claim 18, further comprising forming the second column spacer directly over a portion of the black matrix layer.

* * * * *